US012576592B2

(12) United States Patent
Sadasivuni et al.

(10) Patent No.: US 12,576,592 B2
(45) Date of Patent: Mar. 17, 2026

(54) AUTOMATED MULTI-LAYER TWO-DIMENSIONAL PRINTING

(71) Applicants: Qatar Foundation for Education, Science and Community Development, Doha (QA); Qatar University, Doha (QA)

(72) Inventors: Kishor Kumar Sadasivuni, Doha (QA); Muni Raj Maurya, Doha (QA); Mohammad Talal Houkan, Doha (QA); John-John Cabibihan, Doha (QA)

(73) Assignees: Qatar Foundation for Education, Science and Community Development, Doha (QA); Qatar University, Doha (QA)

( * ) Notice: Subject to any disclaimer, the term of this patent is extended or adjusted under 35 U.S.C. 154(b) by 91 days.

(21) Appl. No.: 18/722,230

(22) PCT Filed: Dec. 20, 2022

(86) PCT No.: PCT/QA2022/050024
§ 371 (c)(1),
(2) Date: Jun. 20, 2024

(87) PCT Pub. No.: WO2023/121494
PCT Pub. Date: Jun. 29, 2023

(65) Prior Publication Data
US 2025/0058523 A1 Feb. 20, 2025

Related U.S. Application Data

(60) Provisional application No. 63/292,780, filed on Dec. 22, 2021.

(51) Int. Cl.
| | |
|---|---|
| *B29C 64/336* | (2017.01) |
| *B29C 64/112* | (2017.01) |

(Continued)

(52) U.S. Cl.
CPC .......... *B29C 64/336* (2017.08); *B29C 64/112* (2017.08); *B29C 64/35* (2017.08);
(Continued)

(58) Field of Classification Search
CPC ... B29C 64/336; B29C 64/112; B29C 64/393; B29C 64/35; B29C 64/371; B33Y 10/00; B33Y 30/00; B33Y 50/02
See application file for complete search history.

(56) References Cited

U.S. PATENT DOCUMENTS

| | | | |
|---|---|---|---|
| 7,790,633 B1 | 9/2010 | Tarafdar et al. |
| 8,689,726 B2 | 4/2014 | Krogman et al. |

(Continued)

OTHER PUBLICATIONS

International Search Report for related International Application No. PCT/QA2022/050024; action dated Jun. 29, 2023; (4 pages).

(Continued)

*Primary Examiner* — Nahida Sultana
(74) *Attorney, Agent, or Firm* — K&L Gates LLP

(57) ABSTRACT

Automated multi-layer two-dimensional printing is provided via a plurality of supply tanks; a deposition tank; a plurality of pumps each comprising: a pipeline in fluid communication with one supply tank and the deposition tank on opposing ends; a bearing holder, including a plurality of rotatable bearings arranged at a shared angle to each other relative to an axis of rotation for the bearing holder; a housing wall, wherein at least a subset of the plurality of rotatable bearings compresses the pipeline against the housing wall; and a motor configured to rotate the bearing holder about the axis of rotation and push a fluid through the pipeline by moving the plurality of rotatable bearings about the axis of rotation to change where the rotatable bearings compress the pipeline against the housing wall; and a spray deposition nozzle in fluid communication with the deposition tank.

13 Claims, 6 Drawing Sheets

(51) Int. Cl.

| | |
|---|---|
| *B29C 64/35* | (2017.01) |
| *B29C 64/371* | (2017.01) |
| *B29C 64/393* | (2017.01) |
| *B33Y 10/00* | (2015.01) |
| *B33Y 30/00* | (2015.01) |
| *B33Y 50/02* | (2015.01) |

(52) U.S. Cl.
CPC .......... *B29C 64/371* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 12,523,309 B2* | 1/2026 | Min | F16K 11/0856 |
| 2016/0074892 A1* | 3/2016 | Reimert | B05B 12/149 |
| | | | 239/303 |
| 2016/0341544 A1 | 11/2016 | Foad | |
| 2018/0304636 A1 | 10/2018 | Chover Lopez et al. | |
| 2020/0306869 A1* | 10/2020 | Hardwick | B23K 20/10 |
| 2022/0212263 A1* | 7/2022 | Phillips | B29C 64/393 |

OTHER PUBLICATIONS

Written Opinion for related International Application No. PCT/QA2022/050024; action dated Jun. 29, 2023; (6 pages).

* cited by examiner

400

410  Receive Deposition Pattern

420  Receive Material into Deposition Tank

430  Deposit Material

440  Monitor Thickness of Deposition

450  Retract Material from Deposition Tank and Select Next Material

460  Flush Deposition Tank

470  Anneal Deposited Layer

END

AUTOMATED MULTI-LAYER TWO-DIMENSIONAL PRINTING

CROSS-REFERENCES TO RELATED APPLICATIONS

The present disclosure is a National Stage filing under 35 U.S.C. 371 of International Application No. PCT/QA2022/050024, filed Dec. 20, 2022, which claims priority to U.S. Provisional Patent Application No. 63/292,780 entitled "AUTOMATED 2D PRINTING METHODS AND MULTILAYERED DEVICES" and filed on Dec. 22, 2021, which is incorporated herein by reference in its entirety.

BACKGROUND

Two-dimensional (2D) printed films are used in the field of sensors, flexible electronics, energy harvesting, and advanced surface coating. The various techniques adopted in the industries for 2D printing include slot die, screen printing, spin coating, and spray coating, etc. In comparison with other techniques, spray deposition has two advantages. First, the spray head is not in close contact with the surface during deposition, which allows the coating of nonplanar surfaces. Second, spray coating is often significantly faster than other techniques as a spray head can move across a substrate. These advantages make spray coating a potential technique to be used in industries for direct coating over a range of materials and surfaces.

Spray coating is a solution-based process. Generally, a liquid precursor is mechanically forced by a carrier gas towards the target surface and generates a thin film of liquid. The atomization of film deposition is generated in different ways, like cavitation of the precursor, droplet size, and high flow gases. Spray coating technology has various advantages, like large area deposition, solution processes, cost-effectiveness, precise control over the thickness, and comparable solar cell efficiency with other large area deposition methods. Moreover, compared to other 2D printing techniques, spray deposition can be implemented on different substrates like glass, wafers, solid substrate, flexible substrate, ceramics, and fabric, etc. Considering these advantages, the spray coating methods have been widely adopted for the fabrication of solar cells, sensors, printed electronics, and surface coatings.

Spray coating is highly suited to deposit 2D layers, as it is a contact-free deposition method that enables conformal coating on the nonplanar structures, industrially scalable for large area deposition, high throughput, and is cost-effective. However, the existing spray coating technology adopted in the industries is developed for coating single 2D layers. As a result, multiple 2D layer coating either requires multiple spray nozzles or manual intervention for changing precursor ink, which is time-consuming, affects the reproducibility of the results, and increases the cost of production. Thus, the commercialization of technology for autonomous deposition of multiple 2D layers on a single stage and in a single run remains a challenge. Significant challenges that the existing spray coating technology is facing are: high instrument cost, single layer deposition, use of multiple nozzle head or sample transfer for depositing multiple layers, lack of film thickness monitoring technology, require technically skilled staff to operate, and less repeatability and accuracy due to manual intervention.

SUMMARY

The present disclosure provides automated 2D printing (spray coating) technology for multi-layer deposition of different materials on a single stage and in a single run. This unique design comprises a multiple feed design for sequential deposition of different layers in the solar cell. The system is capable of controlling/monitoring the thickness of deposited layers during the spray coating. To improve the quality of the deposited film complete deposition process will be done in the inert atmosphere. Moreover, the in-situ annealing provision is provided after the deposition of each layer. This technology eliminates the intermediate steps like sample storage, precursor ink loading, etc.

The present disclosure provides separate feeds for sequential deposition of multiple layers using a single nozzle head, deposition in an inert atmosphere, in situ film thickness controlling/monitoring, in situ annealing in an inert atmosphere, axes (X-Y-Z) of motion with crash prevention sensor on Z-axis, and complete autonomous fabrication of a solar cell via spray coating. The described method can be applied to various industries, for example, fabrication of solar cells, fabrication of sensors (e.g., thermoelectric, pressure, piezoelectric, capacitive, or strain sensors), surface coatings (e.g., corrosion resistance coatings, heat resistance coatings, thermal conducting coatings, hydrophobic/hydrophilic coatings, optical coatings (for light attenuation and filtering)), or printed electronics.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

The present disclosure provides an apparatus and method of use thereof for the fully autonomous spray deposition of multiple layers of different materials, film thickness monitoring, and in-situ annealing in inert conditions on a single platform. A single nozzle head can be used and the deposition can be completed in a single run of a single deposition apparatus. Accordingly, the apparatus does not need to be brought back to a "home" position between deposition of different materials, require a user to switch out the material supplied to the apparatus, or the use of multiple (similar)

apparatuses to deposit different materials, thereby increasing the speed and accuracy of material deposition, among other benefits.

Figure 1:
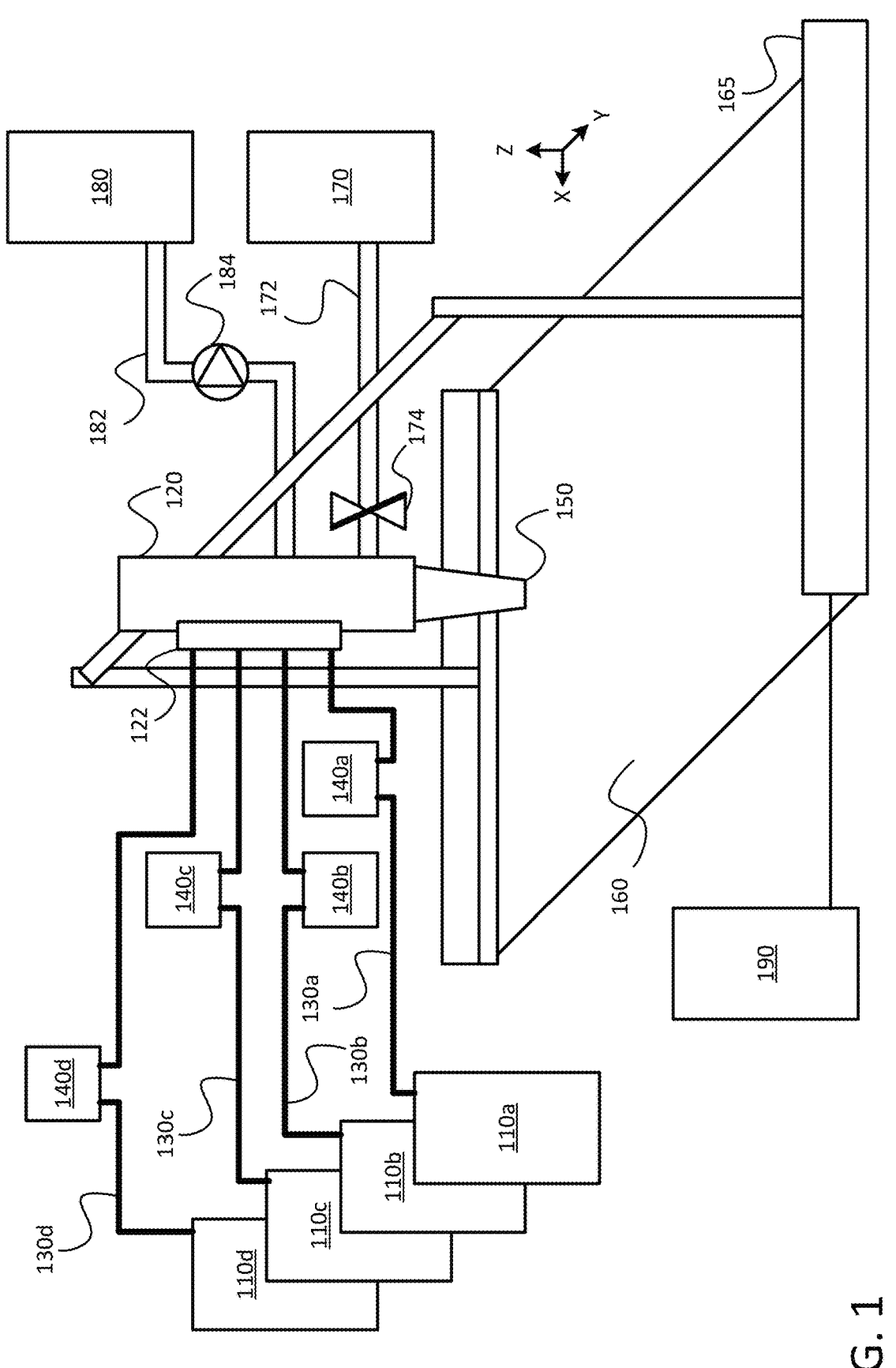
FIG. 1 illustrates an example automated spray coating system, according to aspects of the present disclosure.

FIG. 1 illustrates an example automated spray coating system 100, according to aspects of the present disclosure. The system includes a plurality of supply tanks 110a-d (generally or collectively, supply tank 110) that feed into one deposition tank 120 via a corresponding plurality of pipelines 130a-d (generally or collectively, pipeline 130) in fluid communication with one supply tank 110 and the deposition tank 120 on opposing ends. The deposition tank 120 includes a feed selector 122, which may rotate or actuate via switches or valves to select which of the pipelines 130 (if any) are in fluid communication with the deposition tank 120 at a given time.

A corresponding plurality of pumps 140a-d (generally or collectively, pumps 140) are each connected between one supply tank 110 and the deposition tank 120 around the respective pipelines 130 to control the intake and outtake of material to/from the respective supply tank 110 and the deposition tank 120. The pumps 140 are discussed in greater detail in regard to FIGS. 2A and 2B. Although the illustrated example uses four supply tanks 110, pipelines 130, and pumps 140, in various embodiments, corresponding pluralities of more than or less than four elements may be used.

An adjustable, or selectively replaceable, nozzle 150 is connected to the deposition tank 120 to control a size and shape of a deposition spray of the material in the deposition tank 120 onto a deposition surface 160. In various embodiments, the nozzle 150 is a spray deposition nozzle with a selected bore-size and pattern that can be replace with other nozzles of different bore sizes, different patterns, or combinations thereof, to affect a size and shape of a spray of the material held in the deposition tank 120. In various embodiments, several nozzles 150 may be connected to a selector that rotates different nozzles 150 into and out of fluid communication with the deposition tank 120 to allow for the control of the nozzle 150 used for spray deposition, without requiring a human user to manually swap out nozzles 150 between deposition operations. The nozzle 150 atomizes the material included in the deposition tank 120 when ejected through the nozzle 150

An inert gas supply 170, holding a pressurized nonreactive gas, such as Nitrogen ($N_2$), is connected to one of the deposition tank 120 or the nozzle 150 via a gas supply line 172, which is controlled via a gas control valve 174. The gas control valve 174 operates in at least a first state that prevents the release of gas from the inert gas supply 170 and in a second state that permits the release of the gas to push material held in the deposition tank 120 of out the nozzle 150 and towards the deposition surface 160.

In various embodiments, the deposition surface 160 may include heating elements to anneal any deposited material, and may support a substrate of a material on which the materials held in the supply tanks 110 are to be applied. In some embodiments, the deposition surface 160 is traversable in at least two degrees of freedom by the nozzle 150 and deposition tank 120 to allow deposition of materials at different coordinates relative to the deposition surface 160. In some embodiments, the substrate placed on the deposition surface 160 is translated in at least two degrees of freedom to adjust where a static (in those degrees of freedom) nozzle 150 is located relative to the substrate. A motor assembly 165 is provided to move one or more of the nozzle 150, deposition tank 120, and substrate relative to one another in an XY plane (e.g., via two degrees of freedom) and adjust a relative height between the nozzle 150 relative to a surface on which new material is to be deposited (e.g., via one degree of freedom in the Z axis). In some embodiments, the motor assembly 165 includes a trestle that allows movement along set tracks for each degree of freedom. In some embodiments, the motor assembly 165 includes an arm assembly with various joints to allow translation or rotation for each degree of freedom.

In various embodiments, the deposition surface 160 is included in a chamber having a controllable atmosphere having a controlled composition and pressure. The controllable atmosphere may include an inert gas, which may be the same as the inert gas used by the insert gas supply 170 or a different gas, or vacuum.

A cleaning solution supply 180, holding a cleaning solution, such as water, detergent, bleach, ethanol, ammonia, hydrochloric acid, or the like, and combinations thereof, is connected to the deposition tank 120 via a cleaning supply line 182, which is controlled via a cleaning pump 184. In various embodiments, the cleaning pump 184 shares the design with the pumps 140, but may also have a different design. The cleaning pump 184 operates in at least a first state that prevents the release of the cleaning solution from the cleaning solution supply 180 and in a second state that permits the release of the cleaning solution the deposition tank 120. In various embodiments, the system may purge the cleaning solution from the deposition tank 120 by ejecting the cleaning solution from the nozzle 150, pumping the cleaning solution out of the deposition tank back to the cleaning solution supply 180, to a supply tank 110 that last supplied material into the deposition tank 120, or to a waste tank (not illustrated).

Figure 5:
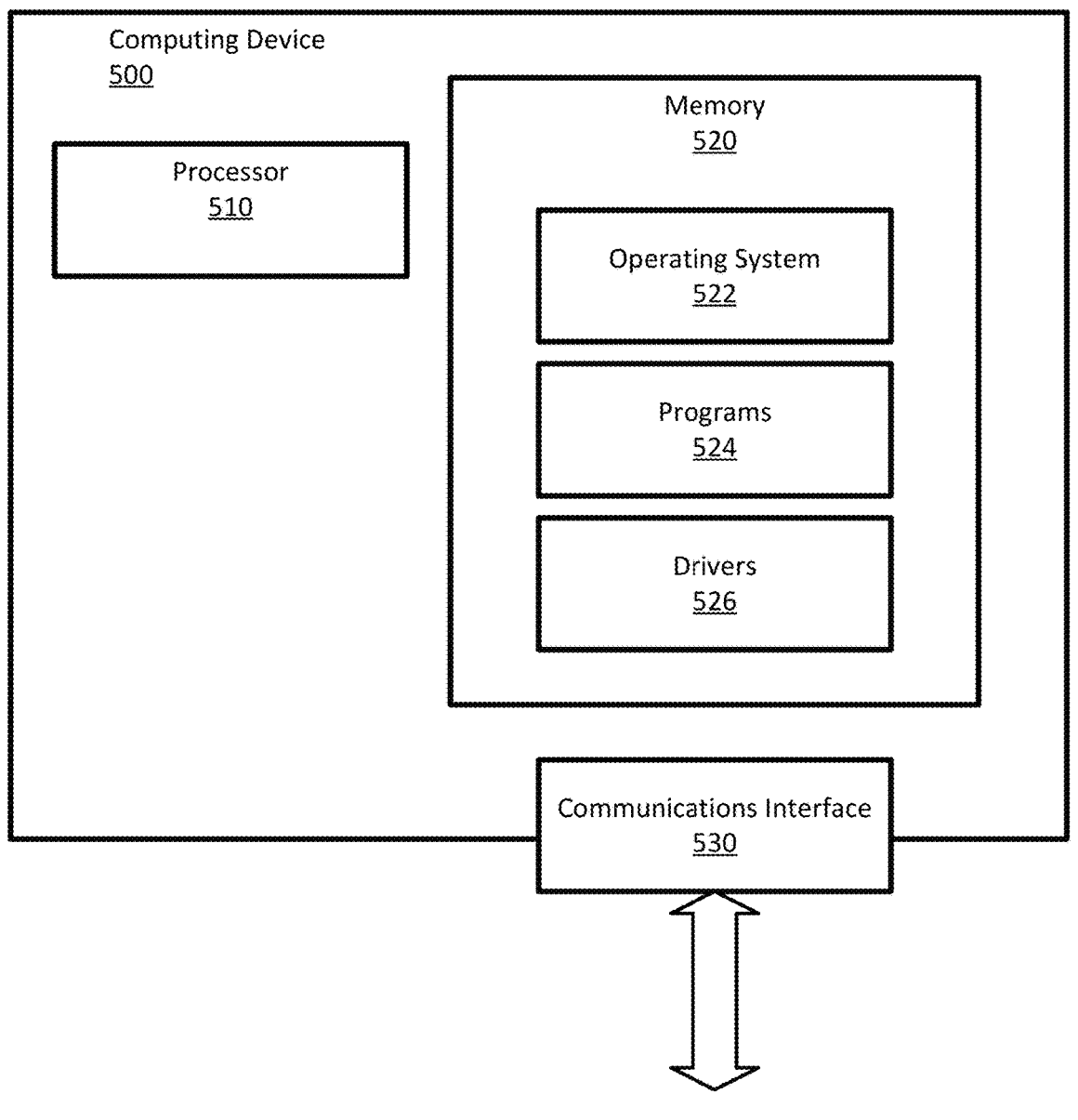
FIG. 5 illustrates an example control schematic for an automated spray coating system, according to aspects of the present disclosure.

A controller 190, such as the computing device 500 discussed in greater detail in regard to FIG. 5, is provided to selectively activate and deactivate the various pumps 140/184, heaters, valve actuators, and motor assemblies 165 based on readings from various sensors included in the system 100, and pre-programmed instructions for how to deposit material to define a desired end-product.

The pipelines 130, gas supply line 172, and cleaning supply line 182 may include various flexible tubing that are sized in length to remain connected to the deposition tank 120 or nozzle 150 as the assembly moves relative to the deposition surface 160.

Figure 2A:
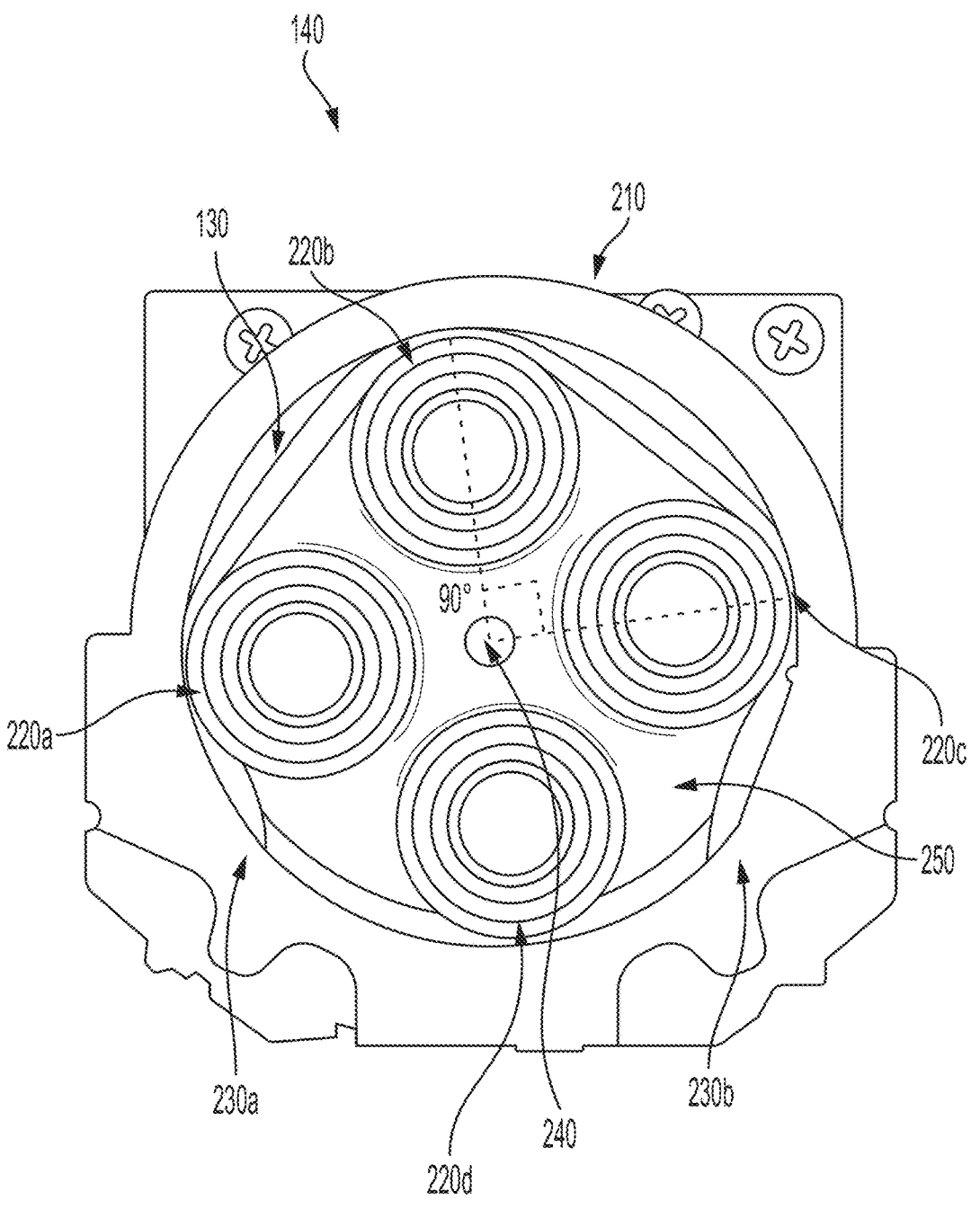
FIGS. 2A and 2B illustrate a pump for use with the automated spray coating system in an assembled view and an exploded view, respectively, according to aspects of the present disclosure.
Figure 2B:
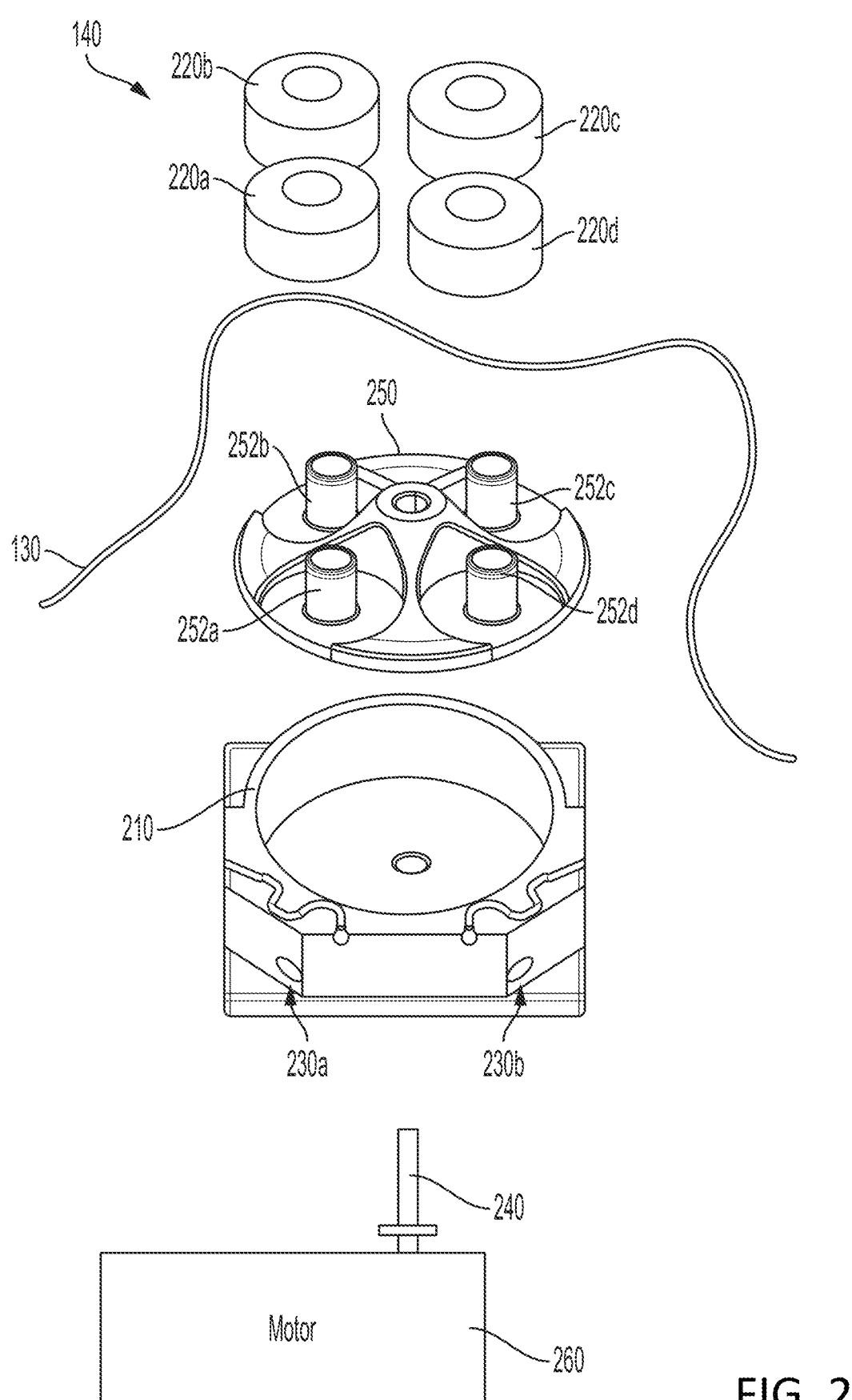

FIGS. 2A and 2B illustrate a pump 140 for use with the automated spray coating system 100 in an assembled view and an exploded view, respectively, according to aspects of the present disclosure. The pump 140 accepts the pipeline 130 from a corresponding supply tank 110 at a point between the supply tank 110 and the deposition tank 120. The accepted pipeline 130 is held in contact with a housing wall 210 of the pump 140 by at least a subset of a plurality of rotatable bearings 220a-c (generally or collectively, rotatable bearing 220). A bearing holder 250 holds the plurality of rotatable bearings 220 in an arrangement at a shared angle to each other relative to an axis of rotation 240 for the bearing holder 250. Each rotatable bearing 220 is held in place by a corresponding bearing axis 252a-d that permits rotation of the corresponding bearing 220 along an axis parallel to the axis of rotation 240 for the pump 140.

As used herein, a shared angle refers to an angle from a reference point (e.g., the axis of rotation 240) to neighboring members of a plurality of members (e.g., the first rotatable bearing 220a and the third rotatable bearing 220c relative to the second rotatable bearing 220b) that remains consistent among the plurality of members such that the shared angle is defined by the formula 360/N, where N is the number of members in the plurality (e.g., 90 degrees for N=4 members). Although illustrated with four rotatable bearings 220, in various embodiments, more or fewer than four rotatable bearings 220 may be included.

During operation, the bearing holder 250 is rotated about the axis of rotation 240 by a motor 260, such as a stepper motor. The bearing holder 250 may rotate both clockwise and counterclockwise about the axis of rotation 240 to delivery material from the associated supply tank 110 to the deposition tank 120 or withdraw or extract material from the deposition tank 120 back to the supply tank 110 for later use. The movement of the bearing holder 250 also moves the associated rotatable bearings 220 to compress the flexible pipeline 130 at different locations against the housing wall 210 to push fluid in the direction of rotation.

FIGS. 3A-3D illustrate an example deposition process 300 using an automated spray coating system 100, according to aspects of the present disclosure. In each of FIGS. 3A-3D, the nozzle 150 ejects a spray 310 onto a designated surface. The nozzle 150 is connected to a deposition tank 120 that is selectively fed one of four materials 320a-c (generally or collectively, material 320) at a time. Although not illustrated in FIGS. 3A-3D, the nozzle 150 or deposition tank 120 may also selectively be in fluid communication with a gas supply 170 and a cleaning solution 180 (e.g., as discussed in relation to FIG. 1). Additionally, although not illustrated in FIGS. 3A-3D, the relative position of the nozzle 150 relative to a substrate 330 may be controlled via various motors to allow movement in an XY plane, in an XYZ volume, with or without some or all of yaw, pitch, and roll (e.g., between two and six degrees of freedom).

A laser 340 and a beam detector 350 are provided as a laser thickness gauge to monitor a thickness (e.g., in the Z direction) of a deposited layer 360a-d (generally or collectively, deposited layer 360) of the material in the spray 310 based on a change in detraction of a beam generated by the laser 340 through the deposited layer 360. In various embodiments, to adjust the point of contact between the beam and the deposited layer 360 as the nozzle 150 deposits more material 320, one or more of the laser 340 and the beam detector 350 may be movable. Accordingly, by maintaining the beam position to be within spray 310, the system 100 can monitor how thick each deposited layer 360 of material 320 is during the deposition process, thereby allowing the nozzle 150 to be moved at an adjustable rate to account for variance in the deposition process to avoid over-deposition or under-deposition.

Figures 3A, 3B, 3C, 3D:
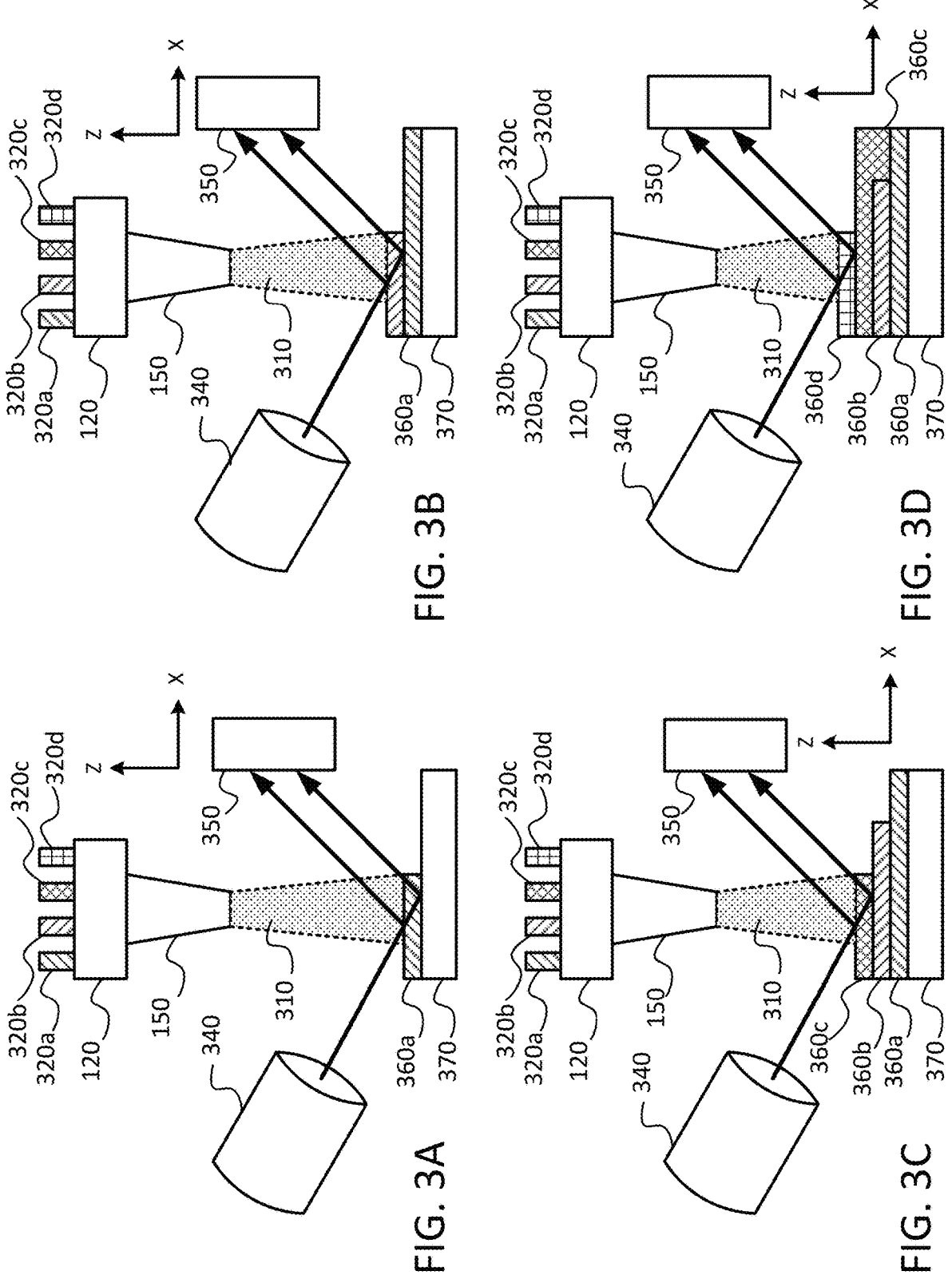
FIGS. 3A-3D illustrate an example deposition process using an automated spray coating system, according to aspects of the present disclosure.

Each of the deposited layers 360 may be formed with the same or different thicknesses compared to each other, and may be defined in different areas on the earlier-deposited layers to have different thicknesses throughout a given deposited layer 360. For example, as is shown in FIG. 3D, the second deposited layer 360b is formed on a portion of the first deposited layer 360a such that the third deposited layer 360a is formed on the second deposited layer 360b and the first deposited layer 360a. Accordingly, for the third deposited layer 360c to have a flat upper surface (e.g., parallel to the surface of the substrate 370), the third deposited layer 360c exhibits different thicknesses in different regions to account for the presence of absence of the second deposited layer 360b in those regions.

The laser 340 is set up to be reflected from the substrate 370 or deposited layer 360 that is being sprayed coated. During spray deposition of the film, a fraction of the beam is scattered or absorbed, reducing the total amount of light reaching the detector 350. The laser beam reflected from the film surface and the surface of the substrate 370 or deposited layer 360 on which the new film is being formed interferes constructively or destructively. In real-time, the reflected beam intensity oscillates due to interference. The reflected beam intensity goes through a complete oscillation when the path difference between beams reflected from the surfaces of the film change by one wavelength. If the change of the film thickness is one complete oscillation, it is can be denoted as Δt and calculated by Equation 1, where β is the angle of incidence (to normal, e.g., the Z axis), n is the refraction of the material 320 and λ is the wavelength of the beam generated by the laser 340.

$$\Delta t = \frac{\lambda}{2n} \cos\left(\sin^{-2}\left(\frac{\sin(\beta)}{n}\right)\right) \qquad \text{Equation 1}$$

For example, when fabricating a solar panel, the substrate 370 may be a glass (e.g., a fluorine doped tin oxide (FTO) glass) or a semiconductor (e.g., Silicon wafer) that the nozzle 150 applies a first material 320a of Zinc Oxide (ZnO) to, as is shown in FIG. 3A. Once the deposited layer 360a of ZnO is set, and the deposition tank 120 is charged with a second material 320b of perovskite, the nozzle 150 begins depositing the second material 320b to the first deposited layer 360a. Similarly, once the second deposited layer 360b of perovskite is set, and the deposition tank 120 is charged with a third material 320c of an electron transport later material (e.g., Spiro-OMeTAD), the nozzle 150 begins depositing the third material 320c to the second deposited layer 360b. Similarly, once the third deposited layer 360c of the electron transport later material is set, and the deposition tank 120 is charged with a fourth material 320d of carbon, the nozzle 150 begins depositing the fourth material 320c to the third deposited layer 360b to form the fourth deposited layer 360d.

Figure 4:
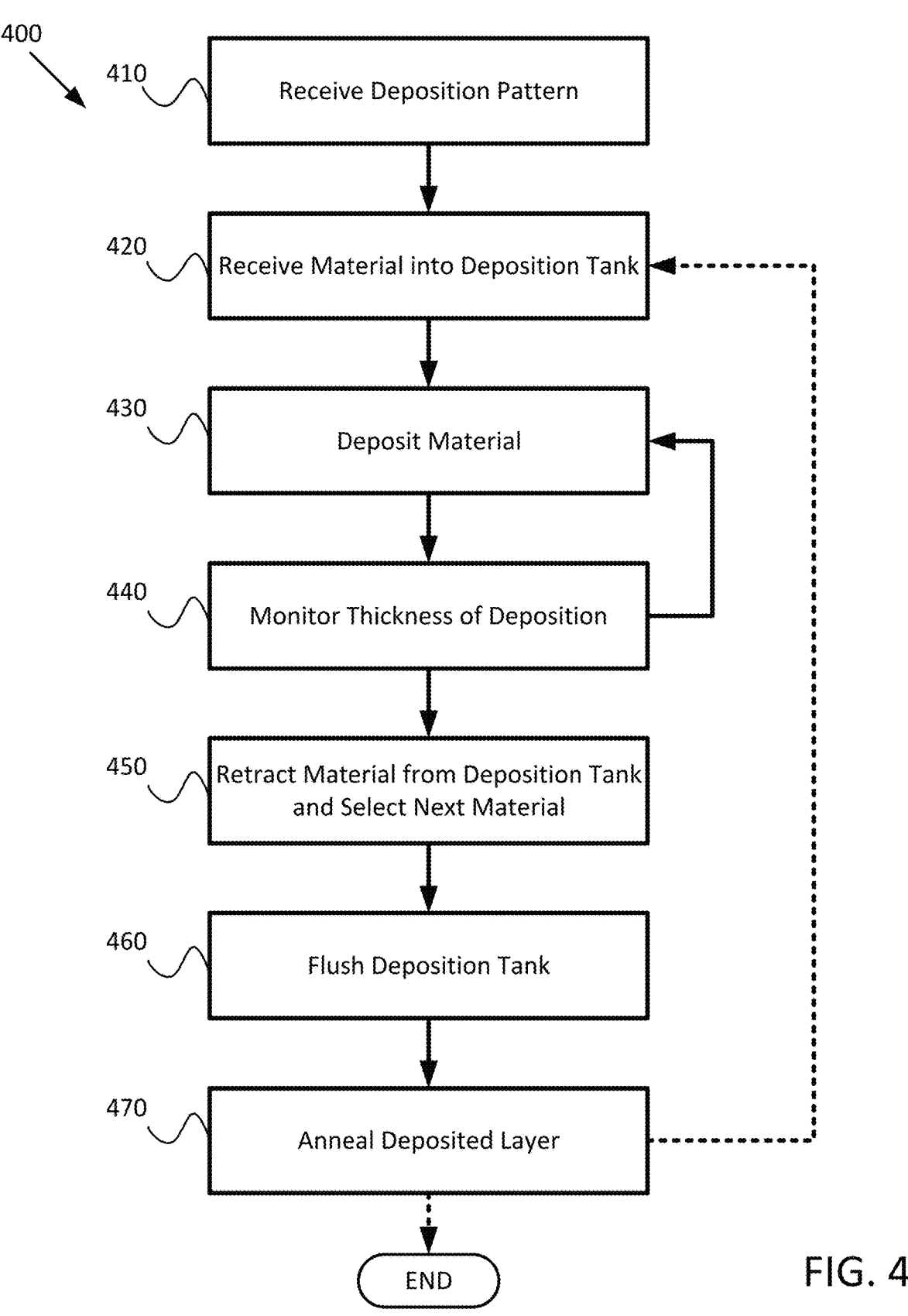
FIG. 4 is a flowchart for an example method for multi-layer deposition using an automated spray coating system, according to aspects of the present disclosure.

FIG. 4 is a flowchart for an example method 400 for multilayer deposition using an automated spray coating system 100, according to aspects of the present disclosure. The example method 400 begins at block 410, where the system 100 receives instructions for a deposition pattern. The instructions indicate where the various materials 320 are to be deposited, when the various materials 320 are to be deposited, how thick the various materials 320 are to be deposited, whether any supplemental actions are to be taken between depositing different materials 320 (e.g., flushing per block 460, annealing per block 470, changing a nozzle 150 out, etc.), and other instructions for the spray deposition fabrication of a device. The system 100 may store the instructions in memory until signaled by an operator or a triggering condition to proceed with the example method 400.

At block 420, the system 100 receives material 320 from a supply tank 110 into the deposition tank 120. In various embodiments, a pump 140 operating in a first configuration pumps the material 320 from an associated supply tank 110 into the deposition tank 120. In some embodiments, a nozzle control rotates or otherwise switches in/out a current nozzle 150 for a new nozzle 150 with a different spray pattern, bore size, or the like (or to avoid cross-contact of different materials 320 without having to clean the nozzle 150). In various embodiments, the materials 320 may be used with various suitable spray coating solvents such as isopropanol, Dimethylformamide (DMF), ethanol, N-Methyl-2-Pyrrolidone (NMP), Dimethyl Sulfoxide (DMSO), acetone, Tetrahydrofuran (THF), Chloroform, Cyclohexanone, etc.

At block 430, the system 100 deposits material 320 onto a designated surface. An inert gas, at high pressure, forces the material 320 held in the deposition tank 120 out through the nozzle 150 and onto a designated surface. In various embodiments, the material 320 may be deposited onto a substrate 370 or a previously-deposited layer 360. In various embodiments, the deposition pattern (received per block 410) may specify whether the deposited layers 360 may overlap in the Z dimension. For example, a first film of a first material 320a may be formed as a first deposited layer 360a on a substrate 370 and a second film of a second material 320b may be formed as a second deposited layer 360b entirely on top of the first deposited layer 360a, or on top of the first deposited layer 360a and the substrate 370 (e.g., in a region of the substrate 370 over which the first film is not formed).

At block 440, the system 100 monitors the thickness of the deposited layer 360 of the material 320. Block 440 may be performed continuously with block 430. In various embodiments, a paired laser 340 and detector 350 are used to determine the thickness of the deposited layer 360 based on changes in wavelength or phase in portions of a laser beam reflected from a top surface of the deposited layer 360 versus a bottom surface of the deposited layer 360 (or the top surface of the material thereunder). When the thickness reaches a desired height, according to the deposition pattern, the system 100 moves the nozzle 150 to a new location to continue depositing material (returning to block 430) until the deposited layer 360 matches the pattern prescribed by the deposition pattern (proceeding to block 450)

At block 450, the system 100 retracts the material received into the deposition tank (per block 420) that was not deposited onto a surface (per block 430). In various embodiments, the system 100 runs the pump 140 used to supply the material from the respective supply tank 110 in reverse, thereby returning excess material 320 to the corresponding supply tank 110 for later use.

At block 460, which may be omitted in some instances or performed contemporaneously with the operations described in some of the blocks of the example method 400, the system flushes the deposition tank 120 with a cleaning solution. The cleaning solution may include water, detergent, bleach, ethanol, ammonia, hydrochloric acid, or the like, and combinations thereof to collect remaining traces of the material retracted from the deposition tank (per block 450). In various embodiments, the cleaning solution is pumped into the deposition tank 120, and retracted as part of the flushing process. In various embodiments, the flushed cleaning solution (and any material 320 captured thereby) is pumped out of the deposition tank 120 and back into a cleaning solution tank 180 that supplied the cleaning solution, into the supply tank 110 that supplied the material 320, or a waste container. In some embodiments, the flushed cleaning solution is (and any material 320 captured thereby) is pumped out through the nozzle 150 into a catchment area in the system 100.

At block 470, which may be omitted in some instances or performed contemporaneously with the operations described in some of the blocks of the example method 400, the system 100 anneals the deposited layer. In various embodiments, heating elements included in a deposition surface are activated to heat the last-deposited layer to a target temperature.

After performing (or purposely omitting) block 470, the example method 400 may return to block 420 to proceed with depositing the next material 320, or if the deposition pattern indicates that the last-applied layer is the final layer of the device to be fabricated by the system 100 (in a current configuration), the example method 400 may end.

FIG. 5 illustrates physical components of an example computing device 500, according to embodiments of the present disclosure. The computing device 500 may include at least one processor 510, a memory 520, and a communication interface 530 and may be used as a controller for the system 100 described herein.

The processor 510 may be any processing unit capable of performing the operations and procedures described in the present disclosure. In various embodiments, the processor 510 can represent a single processor, multiple processors, a processor with multiple cores, and combinations thereof.

The memory 520 is an apparatus that may be either volatile or non-volatile memory and may include RAM, flash, cache, disk drives, and other computer readable memory storage devices. Although shown as a single entity, the memory 520 may be divided into different memory storage elements such as RAM and one or more hard disk drives. As used herein, the memory 520 is an example of a device that includes computer-readable storage media, and is not to be interpreted as transmission media or signals per se.

As shown, the memory 520 includes various instructions that are executable by the processor 510 to provide an operating system 522 to manage various features of the computing device 500 and one or more programs 524 to provide various functionalities to users of the computing device 500, which include one or more of the features and functionalities described in the present disclosure. One of ordinary skill in the relevant art will recognize that different approaches can be taken in selecting or designing a program 524 to perform the operations described herein, including choice of programming language, the operating system 522 used by the computing device 500, and the architecture of the processor 510 and memory 520. Accordingly, the person of ordinary skill in the relevant art will be able to select or design an appropriate program 524 based on the details provided in the present disclosure.

Additionally, the memory 520 can include one or more drivers 526 for controlling motors, actuators, switches, and the like in the system 100 to control the deposition process described herein.

The communication interface 530 facilitates communications between the computing device 500 and other devices, which may also be computing devices 500 as described in relation to FIG. 5. In various embodiments, the communication interface 530 includes antennas for wireless communications and various wired communication ports. The computing device 500 may also include or be in communication, via the communication interface 530, one or more input devices (e.g., a key board, mouse, pen, touch input device, etc.) and one or more output devices (e.g., a display, speakers, a printer, etc.).

Accordingly, the computing device 500 is an example of a system that includes a processor 510 and a memory 520 that includes instructions that (when executed by the processor 510) perform various embodiments of the present disclosure. Similarly, the memory 520 is an apparatus that includes instructions that when executed by a processor 510 perform various embodiments of the present disclosure.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Without further elaboration, it is believed that one skilled in the art can use the preceding description to use the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A device, comprising:
a plurality of supply tanks;
a deposition tank;
a plurality of pumps, each pump of the plurality of pumps connected to one supply tank of the plurality of supply tanks and to the deposition tank, each pump of the plurality of pumps comprising:
    a pipeline in fluid communication with the one supply tank of the plurality of supply tank and in fluid communication with the deposition tank on opposing ends;
    a bearing holder, including a plurality of rotatable bearings arranged at a shared angle to each other relative to an axis of rotation for the bearing holder;
    a housing wall, wherein at least a subset of the plurality of rotatable bearings compresses the pipeline against the housing wall; and
    a stepper motor, connected to the bearing holder, configured to rotate the bearing holder about the axis of rotation and push a fluid through the pipeline by moving the plurality of rotatable bearings about the axis of rotation to change where the rotatable bearings compress the pipeline against the housing wall; and
a spray deposition nozzle in fluid communication with the deposition tank.

2. The device of claim 1, wherein the spray deposition nozzle is selectively replaceable for a second spray deposition nozzle with a different bore.

3. The device of claim 1, further comprising:
an inert gas supply;
a gas supply line in communication with the inert gas supply and the deposition tank; and
a gas control valve that in a first state prevents release of gas from the inert gas supply into deposition tank and in a second state permits release of the gas.

4. The device of claim 1, further comprising:

a positional motor having at least two degrees of freedom of movement relative to a deposition surface; and
a controller that executes instructions to activate the positional motor to adjust a location of the spray deposition nozzle relative to the deposition surface according to the at least two degrees of freedom.

5. The device of claim 4, further comprising:
a laser thickness gauge, in communication with the controller.

6. The device of claim 1, further comprising:
a cleaning supply;
a cleaning supply line in communication with the cleaning supply and the deposition tank; and
a cleaning pump that delivers a cleaning solution from the cleaning supply to the deposition tank via the cleaning supply line in a first state and prevents the cleaning solution from being delivered to the deposition tank in a second state.

7. The device of claim 1, each pump of the plurality of pumps has a first mode of operation that supplies a material to the deposition tank from a corresponding supply tank of the plurality of supply tanks and a second mode of operation that retracts the material from the deposition tank for return to the corresponding supply tank.

8. The device of claim 1, wherein each supply tank of the plurality of supply tanks holds a different material.

9. The device of claim 1, wherein the plurality of rotatable bearings consists of four bearings, wherein at least three of the four bearings at any time compress the pipeline against the housing wall.

10. The device of claim 1, wherein each rotatable bearing of the plurality of rotatable bearings is free to rotate about a corresponding bearing axis parallel to the axis of rotation.

11. A pump, comprising:
a flexible pipeline;
a bearing holder, including a plurality of rotatable bearings arranged at a shared angle to each other relative to an axis of rotation for the bearing holder;
a housing wall, wherein at least a subset of the plurality of rotatable bearings compresses the flexible pipeline against the housing wall; and
a stepper motor, connected to the axis of rotation for the bearing holder, configured to rotate the bearing holder about the axis of rotation and push a fluid through the flexible pipeline by moving the plurality of rotatable bearings about the axis of rotation to change where the rotatable bearings compress the flexible pipeline against the housing wall.

12. The pump of claim 11, wherein the flexible pipeline of the pump is connected to a first supply tank and a deposition tank, and wherein a second pump, connected to a second supply tank, is also connected to the deposition tank.

13. The pump of claim 11, wherein the plurality of rotatable bearings consists of four bearings, wherein at least three of the four bearing at any time compress the flexible pipeline against the housing wall.

* * * * *